United States Patent [19]

Inaguma et al.

[11] Patent Number: 5,558,177
[45] Date of Patent: Sep. 24, 1996

[54] POWER STEERING APPARATUS

[75] Inventors: Yoshiharu Inaguma, Nagoya; Yutaka Mori, Toyohashi; Keiji Suzuki, Okazaki; Takuya Ohkubo, Chiryu, all of Japan

[73] Assignee: Toyoda Koki Kabushiki Kaisha, Kariya, Japan

[21] Appl. No.: 314,622

[22] Filed: Sep. 29, 1994

[30] Foreign Application Priority Data

Sep. 30, 1993 [JP] Japan .................................. 5-245167

[51] Int. Cl.$^6$ ...................................................... B62D 5/09
[52] U.S. Cl. ........................ 180/422; 180/429; 91/375 A; 137/625.21; 137/625.65
[58] Field of Search ..................................... 180/132, 148, 180/149, 151, 154, 159, 161, 141, DIG. 4, DIG. 7, 142, DIG. 9; 91/375 A; 137/625.21, 625.24, 625.65

[56] References Cited

U.S. PATENT DOCUMENTS 4,618,017  10/1986  Liebert et al. .......................... 180/133

Primary Examiner—Anne Marie Boehler
Assistant Examiner—F. Zeender
Attorney, Agent, or Firm—Oblon, Spivak, McClelland, Maier & Neustadt, P.C.

[57] ABSTRACT

A power steering apparatus including an electric motor for operating a hydraulic pump which supplies pressurized fluid, a directional control valve of center-closed type operable by a steering wheel for delivering the pressurized fluid supplied by the hydraulic pump selectively to a pair of cylinder chambers of a power cylinder through a supply passage, and motor controller for controlling the electric motor. While the steering wheel is at its neutral position, the controller drives the electric motor intermittently at such a low speed that does not deteriorate the efficiency of said electric motor so much so that differential pressure between a pressure at the supply passage and a higher one of pressures in the pair of cylinder chambers is returned to a predetermined first value.

8 Claims, 6 Drawing Sheets

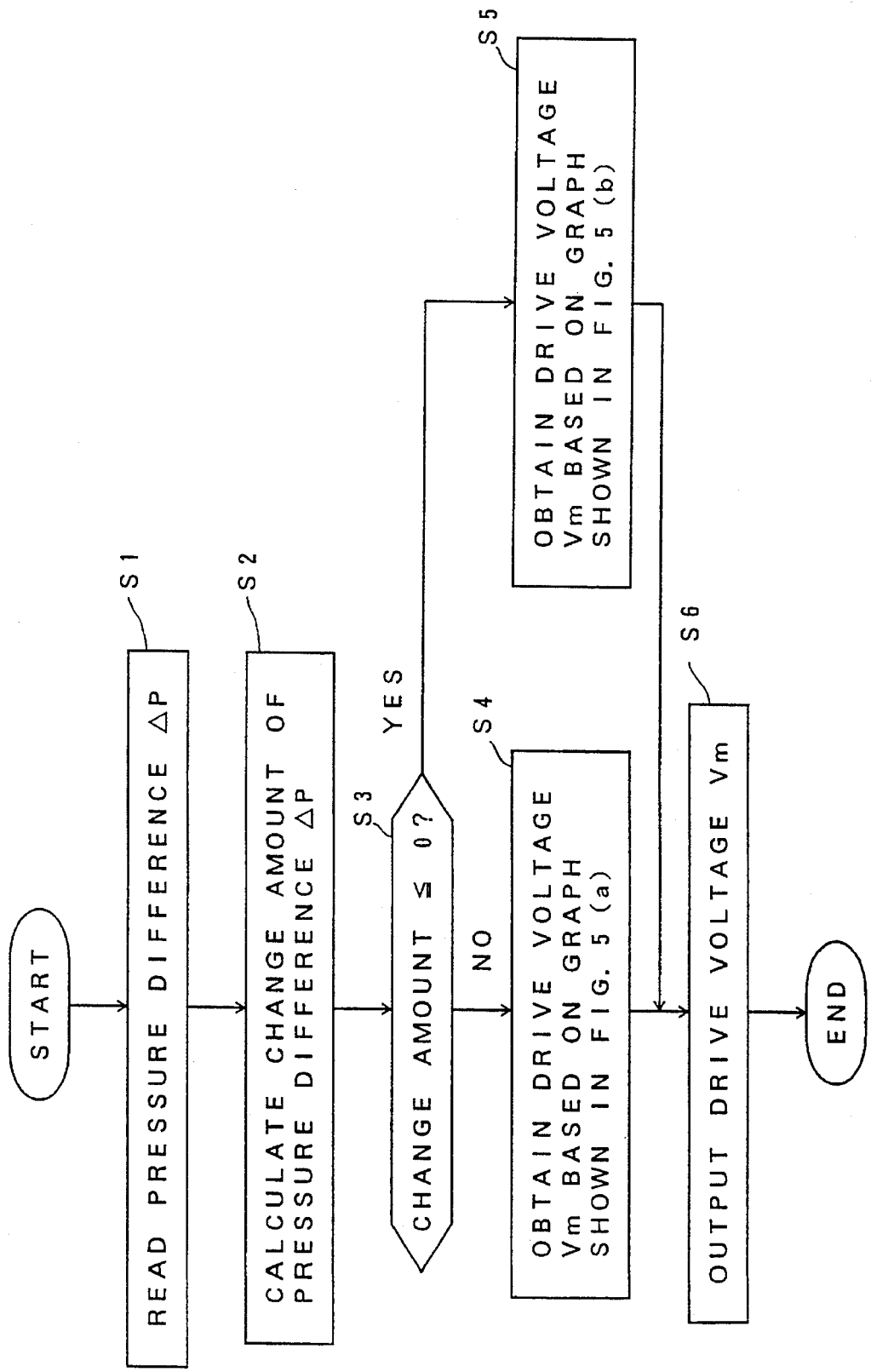

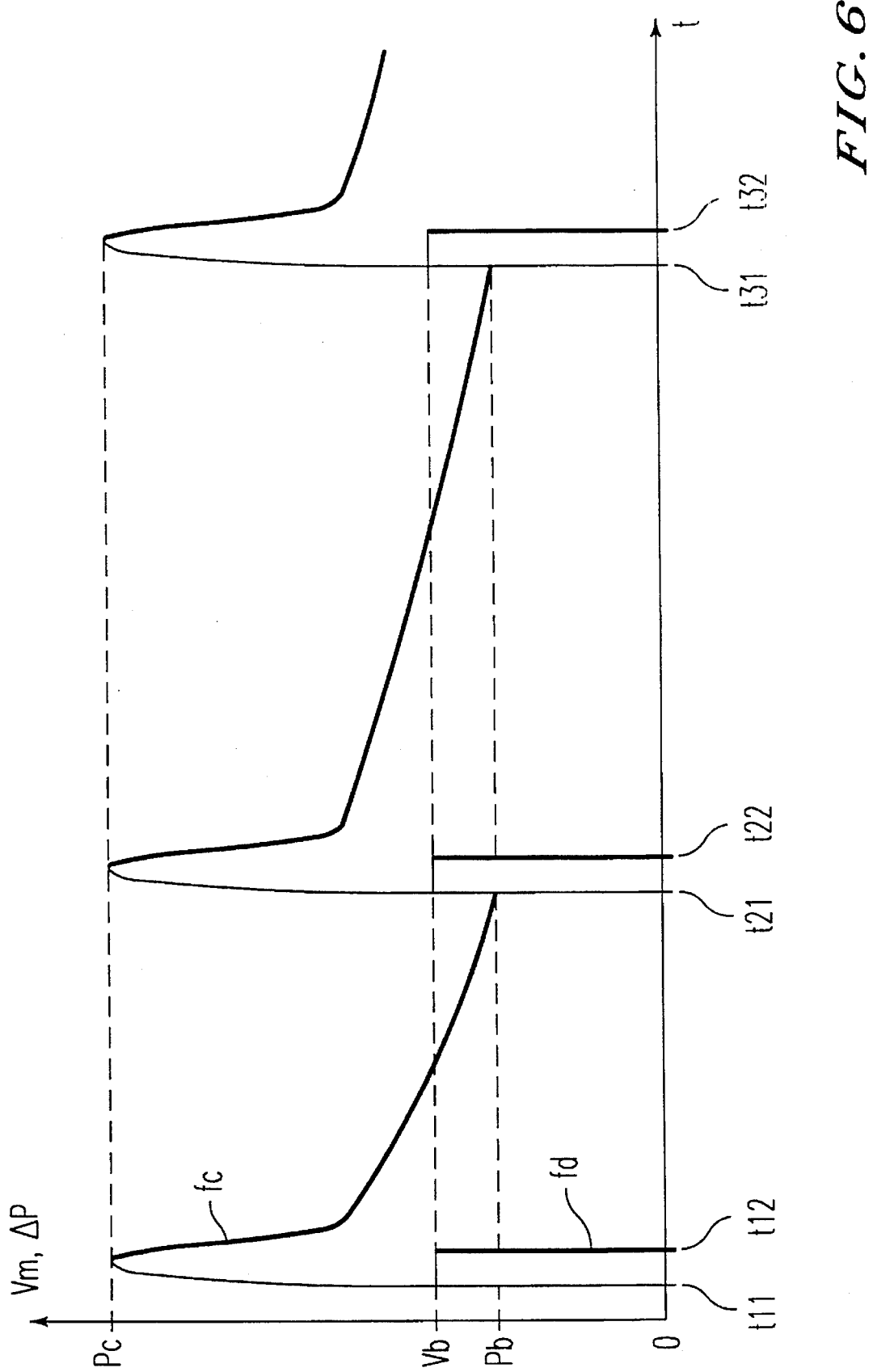

POWER STEERING APPARATUS

BACKGROUND OF THE INVENTION

1. Field of the Invention

The present invention relates to a power steering apparatus for reducing a steering force which is required for a driver to steer a steering wheel of a vehicle.

2. Discussion of the Prior Art

The assignee of the present invention has proposed a power steering apparatus of the type wherein a hydraulic pump is driven by an electric motor for generating an oil pressure. In the power steering apparatus of this type, a rotary valve of center-closed type is used as a directional control valve. The directional control valve is operated upon relative rotation between an input shaft connected with a steering wheel and an output shaft connected with a road wheel. While the steering wheel is maintained at its neutral position, the hydraulic pump is shut off from a power cylinder which generates a force for assisting the steering operation. When the steering wheel is steered so that relative rotation is effected between the input and output shafts, the hydraulic pump communicates with one of two cylinder chambers of the power cylinder to supply pressurized oil thereto. The pressure in a passage connecting the hydraulic pump and the directional control valve is compared to a higher one of the pressures in the two cylinder chambers of the power cylinder. When the detected pressure difference becomes larger than a predetermined value, the electric motor is stopped.

In such system, while the steering wheel is maintained at its neutral position so that the vehicle continues to travel straight, the electric motor is stopped. From the beginning of steering the steering wheel, oil pressure is immediately generated in one of the cylinder chambers of the power cylinder to assist the steering operation. Therefore, the energy consumed by the electric motor can be reduced and smooth steering operation can be realized.

FIG. 1 is a graph showing the relationship between drive voltage Vm output to the electric motor and the pressure difference ΔP in the aforementioned power steering apparatus. While the pressure difference ΔP is smaller than a reference value Pa, in other words, in the state that sufficient power assist cannot be obtained, a maximum drive voltage Va is applied to the electric motor. When the pressure difference ΔP is between the reference value Pa and a predetermined value Pe, the drive voltage Vm is decreased in proportion to increases in the pressure difference ΔP. When the pressure difference ΔP is equal to or larger than the predetermined value Pe, the drive voltage Vm is lowered to zero to stop the electric motor.

In case where the pressure difference ΔP does not sufficiently increase (in other words, it is fairly smaller than the predetermined value Pe) at the time when the steering wheel reaches the neutral position, the drive voltage Vm depending on that pressure difference ΔP is applied to the electric motor. As a result, the pressure difference ΔP increases, whereby the drive voltage Vm to the electric motor is decreased. In this manner, the pressure difference ΔP reaches the predetermined value Pe, whereupon the electric motor is stopped. Namely, the drive voltage Vm is changed along the arrow 71 in FIG. 1. In the state that the steering wheel is maintained at the neutral position, the pressure difference ΔP is maintained at the predetermined value Pe because the hydraulic pump is shut off from the power cylinder by the directional control valve of the normally center-closed type, so that the electric motor continues to be stopped.

However, the directional control valve of the aforementioned center-closed type cannot completely shut off the hydraulic pump from the power cylinder. Therefore, even when the steering wheel is maintained at the neutral position, with the electric motor being stopped, a small amount of the pressurized oil leaks to return to a reservoir. Such oil leak causes the pressure difference ΔP to decrease, whereby the electric motor starts to be driven again. The electric motor is continuously rotated at such a super-low speed that the volume of the pressurized oil discharged from the hydraulic pump is equal to that of the oil leak. The rotation at the super-low speed of the electric motor makes the motor efficiency deteriorate notably. Consequently, the conventional system has a drawback that the electric motor continues to be used at a low efficiency, thereby resulting in the waste of battery power.

SUMMARY OF THE INVENTION

Accordingly, it is an object of the present invention to provide an improved power steering apparatus capable of reducing the energy consumed by the power steering apparatus.

Another object of the present invention is to provide an improved power steering apparatus which can prevent an electric motor from being continuously driven at a super-low speed while a steering wheel is maintained at its neutral position.

Briefly, a power steering apparatus according to the present invention comprises a hydraulic actuator having a pair of cylinder chambers and operable to generate assisting power, a hydraulic pump for supplying pressurized fluid, an electric motor for operating the hydraulic pump, a directional control valve mechanism of center-closed type operable by a steering wheel for delivering the pressurized fluid supplied by the hydraulic pump selectively to the pair of cylinder chambers of the hydraulic actuator through a supply passage, and motor control means for controlling the electric motor. The electric motor is driven intermittently at such a low speed that does not deteriorate the efficiency of said electric motor so much while the steering wheel is at its neutral position so that differential pressure between a pressure at the supply passage and a higher one of pressures in the pair of cylinder chambers is returned to a first predetermined first value.

With this configuration, while the steering wheel is maintained at its neutral position, the electric motor is intermittently driven at a predetermined low speed. The predetermined low speed is such that the efficiency of the electric motor does not deteriorate so much: namely that the electric motor can operate at a fairly higher efficiency than it does at the aforementioned super-low speed. As a result, the electric motor can be prevented from being continuously rotated at a super-low speed.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 4 is a flowchart illustrating process executed by a CPU shown in FIG. 3 for carrying out the present invention;

FIG. 6 is a graph showing time-dependant changes of the drive voltage and the pressure difference when the steering wheel is maintained at its neutral position.

DETAILED DESCRIPTION OF THE PREFERRED EMBODIMENT

Figure 1:
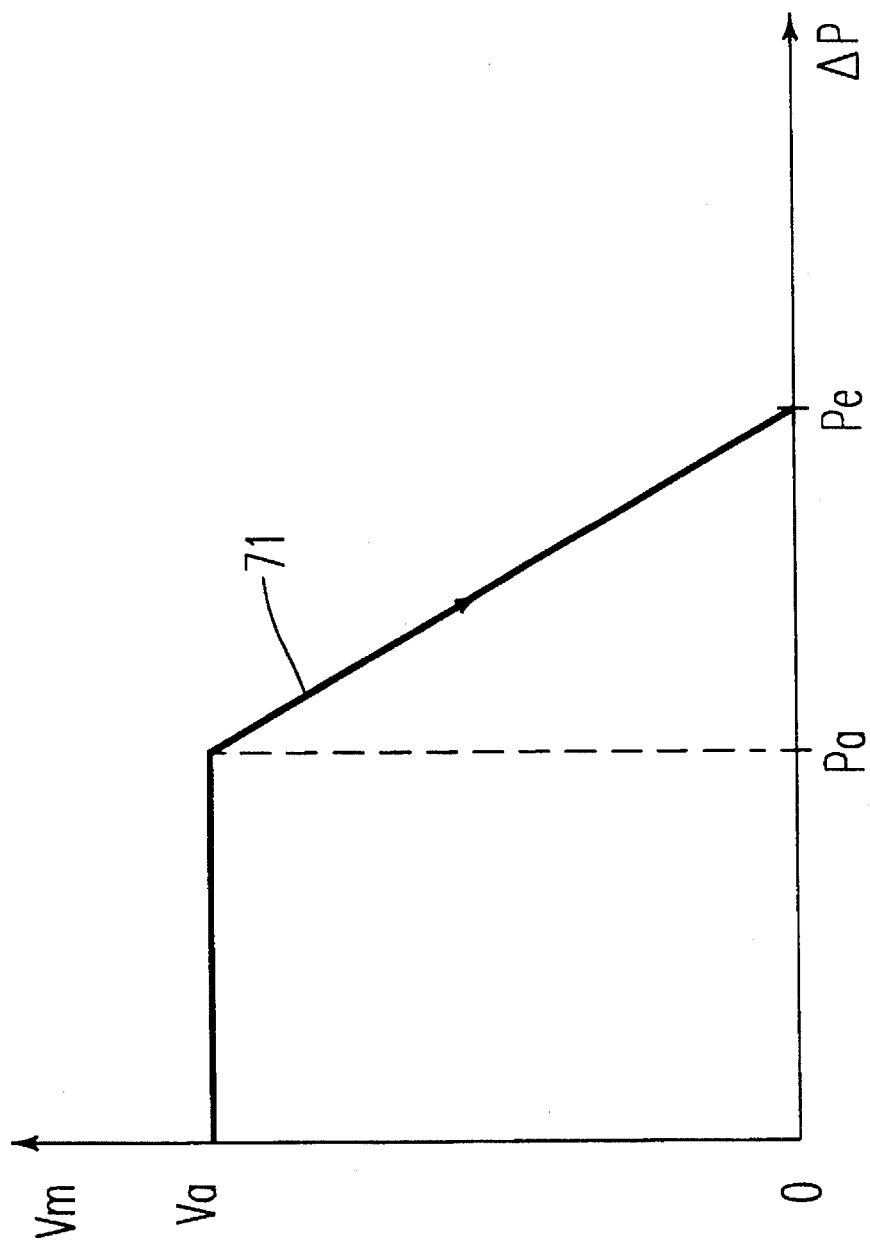
FIG. 1 is a graph showing the relationships between drive voltage for controlling an electric motor of a conventional power steering apparatus and a pressure difference which occurs between a supply passage and a higher one of cylinder chambers of a power cylinder.
Figure 2:
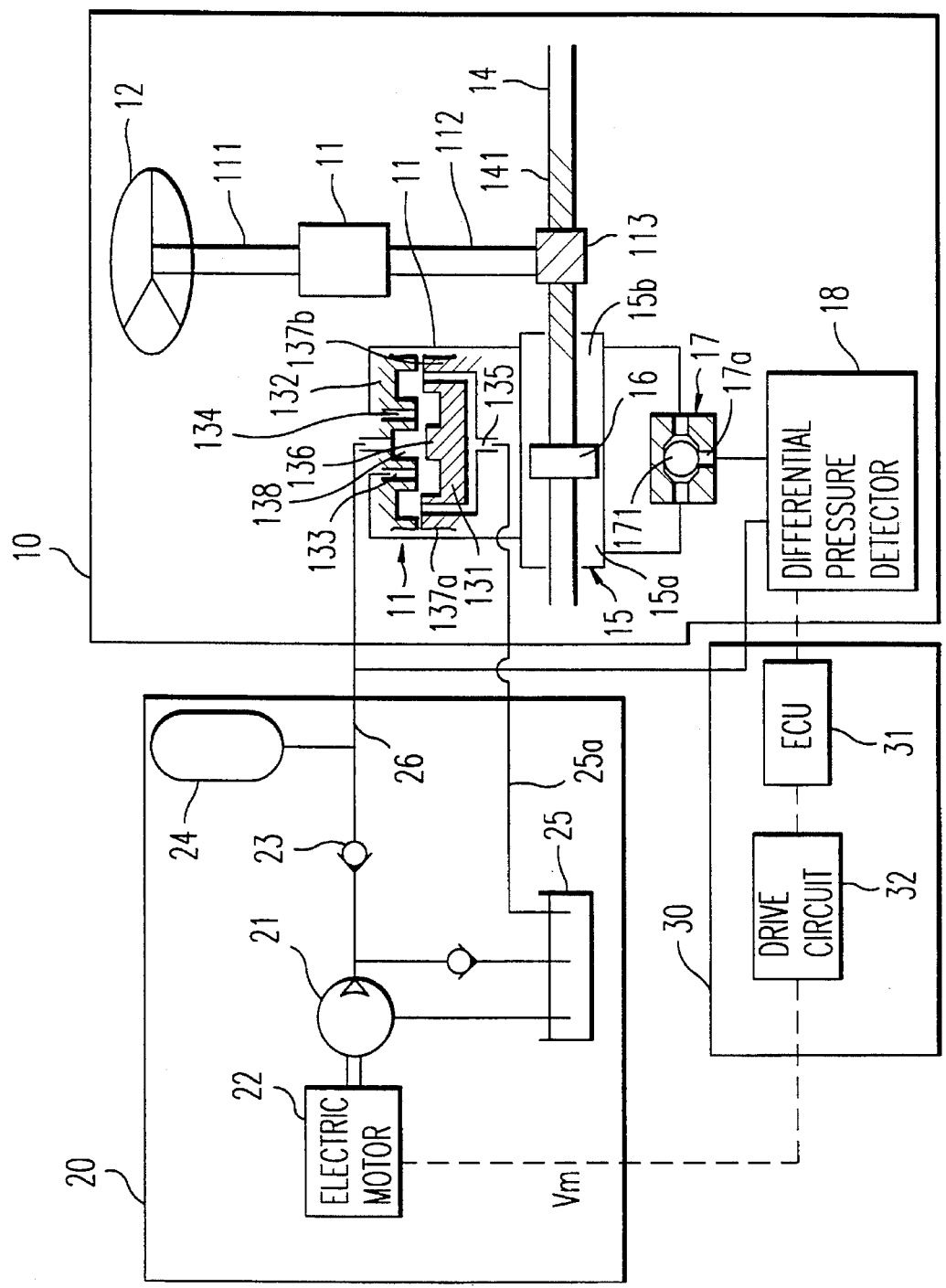
FIG. 2 is a block diagram illustrating the overall structure of a power steering apparatus according to the present invention and a control system therefor.

The preferred embodiment of the present invention will now be described in detail with reference to drawings. FIG. 2 is a block diagram showing the overall structure of a power steering apparatus according to the present invention. The power steering apparatus is mainly composed of a gear valve portion 10, a motor-driven pump portion 20 and a motor control portion 30 for controlling the motor-driven pump portion 20.

The gear valve portion 10 will be firstly described. Numeral 111 denotes an input shaft connected to a steering wheel 12 for rotation therewith, and numeral 112 denotes an output shaft which is coaxially connected to the input shaft 111 through a not-illustrated torsion bar for relative rotation. Between the input shaft 111 and the output shaft 112, an inner valve 131 and an outer valve 132 which are connected respectively to the input and Output shafts 111 and 112 are disposed to constitute a directional control valve 11, or preferably, a rotary servo valve. The inner valve 131 and the outer valve 132 are formed with a supply port 138, cylinder ports 133 and 134 and a drain port 135. This directional control valve 11 is of the center-closed type and operates upon relative rotation between the input shaft 111 and the output shafts 112 so that one of the two cylinder ports 133 and 134 communicates with the supply port 138, while the other thereof is shut off from the supply port 138.

To describe in detail, in case where the steering wheel 12 is at the neutral position, both of the cylinder ports 133 and 134 are shut off from the supply port 138 by a first land portion 136 formed on the inner valve 131 and communicate with the drain port 135 through second land portions 137a and 137b formed on the inner valve 131. When the steering wheel 12 is steered in the clockwise direction to effect relative rotation between the inner and outer valves 131 and 132, the cylinder port 133 communicates with the supply port 138. To the contrary, when the steering wheel 12 is steered in the counterclockwise direction, the cylinder port 134 communicates with the supply port 138. Preferably, the valve 11 is formed at each of several (e.g., three) circumferentially spaced portions thereof with a valve section comprising those shown by reference numerals 133–138.

The output shaft 112 is formed at its bottom end with a pinion gear 113, with which a rack gear 141 formed on a rack shaft 14 is engaged. The rack shaft 14 is connected to a piston 16 of a power cylinder 15 which generates a force for assisting the steering operation. The interior of the power cylinder 15 is divided by the piston 16 into a left cylinder chamber 15a and a right cylinder chamber 15b which communicate with the cylinder ports 133 and 134, respectively.

A shuttle valve 17 communicates with the left and right cylinder chambers 15a and 15b and has a ball 171 in its interior passage. The ball 171 is moved left and right FIG. 2 in response to a pressure difference between the left and right cylinder chambers 15a and 15b. For example, when the pressure in the left cylinder chamber 15a is higher than that in the right cylinder chamber 15b, the ball 171 is moved right, and the pressure in the left cylinder chamber 15a is led from an output port 17a of the shuttle valve 17 to a differential pressure detector 18. On the contrary, when the pressure in the right cylinder chamber 15b is higher than that in the left cylinder chamber 15a, the ball 171 is moved left, and the pressure in the right cylinder chamber 15b is led from the output port 17a of the shuttle valve 17 to the differential pressure detector 18. When the pressures in the left and right cylinder chambers 15a and 15b are equal to each other, the equal pressure is led to the differential pressure detector 18.

The differential pressure detector 18 detects a pressure difference between a pressure at a supply passage 26 described later and a pressure which is led from the shuttle valve 17, namely a pressure difference ΔP between a pressure at the supply passage 26 and a higher one of the pressures in the left and right cylinder chambers 15a and 15b, and outputs an electric signal corresponding to the detected pressure difference ΔP.

The pump portion 20 will next be described. A hydraulic pump 21 is driven by an electric motor 22. An inlet port of the pump 21 is connected to a reservoir 25 in which fluid is stored, while an outlet port of the hydraulic pump 21 is connected to the supply port 138 of the directional control valve 11 via a check valve 23 and the supply passage 26. The drain port 135 of the directional control valve 11 is connected to the reservoir via a drain passage 25a. Connected to the supply passage 26 is an accumulator 24 for accumulating the pressurized oil discharged from the hydraulic pump 21. The pressurized oil accumulated in the accumulator 24 is supplied to the supply port 138 of the directional control valve 11 and the differential pressure detector 18. At the beginning of the steering operation, the pressurized oil accumulated in the accumulator 24 is immediately supplied to the directional control valve 11. This avoids the assist delay in steering which would otherwise occurs when the delivery of the pressurized oil from the hydraulic pump 21 starts with a delay after the rotation of the electric motor 22 is started.

The motor control portion 30 comprises an ECU (Electric Control Unit) 31 and a drive circuit 32. An electric signal corresponding to the pressure difference ΔP output from the differential pressure detector 18 is supplied to the ECU 31. A drive signal for driving the electric motor 22 is output from the ECU 31 to the drive circuit 32. The drive circuit 32 converts the drive signal to a drive voltage Vm and outputs it to the electric motor 22.

Figure 3:
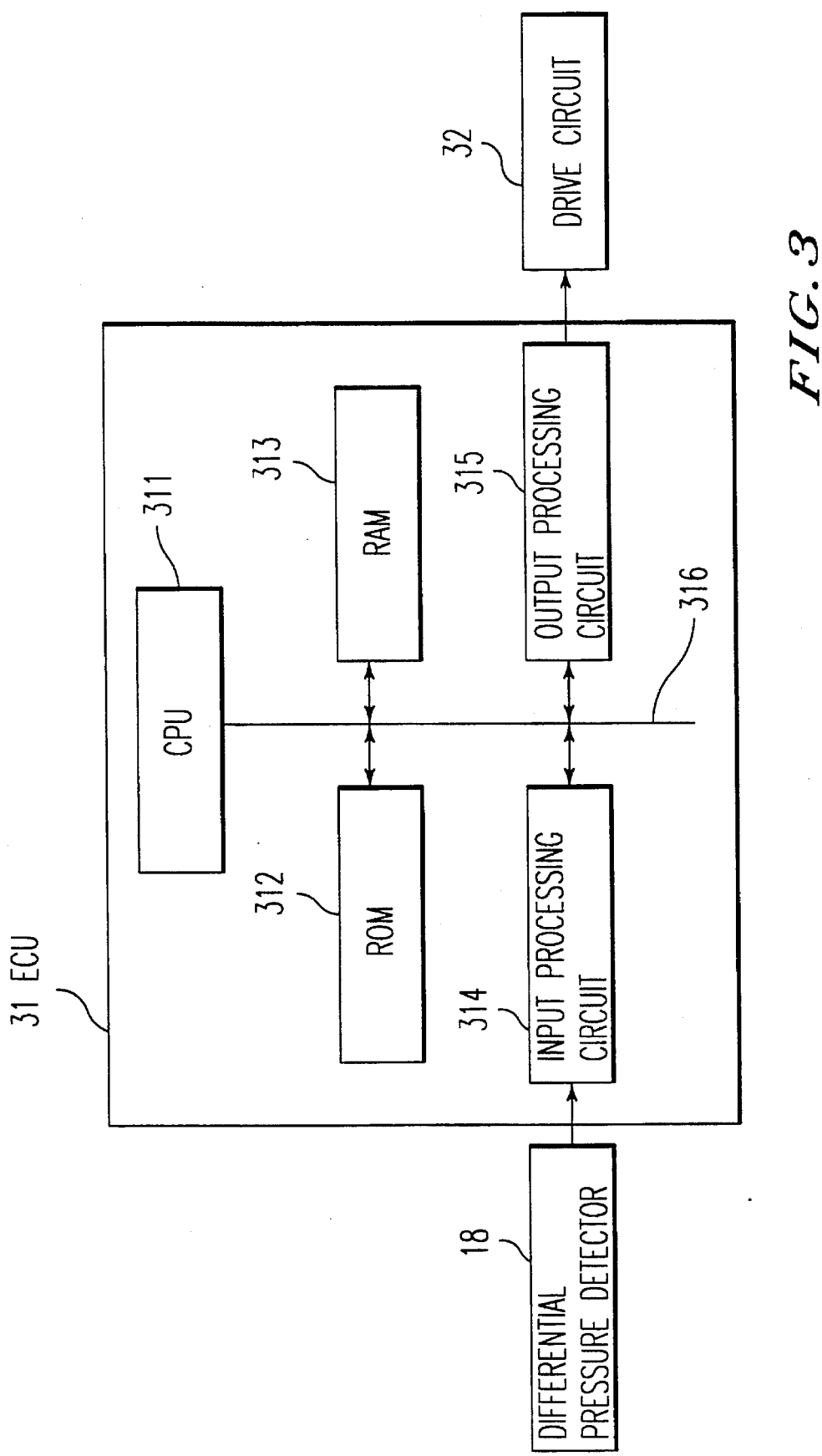
FIG. 3 is a block diagram illustrating the structure of an ECU shown in FIG. 2.

FIG. 3 is a block diagram showing a minimum structure of the ECU 31 required for carrying out the present invention. The ECU 31 is composed of a CPU (Central Processing Unit) 311, ROM 312, RAM 313, an input processing circuit 314 and an output processing circuit 315. The CPU 311 controls the whole of the ECU 31 according to a driving control program memorized in the ROM 312. A so-called "EPROM" or "EEPROM" is used as the ROM 312. A so-called "SRAM" or the like is used as the RAM 313 to store various kinds of data and input and output signals therein. An A–D converter is employed as the input processing circuit 314 for converting an analog signal input from an external apparatus (the differential pressure detector 18 in FIG. 3) to a digital signal. A D–A converter is employed as the output processing circuit 315 for converting a digital signal sent from the CPU through a bus 316 to an analog one and for outputting it to an external apparatus (the drive circuit 32 in FIG. 3).

The operation of the power steering apparatus as constructed above will be now described. When the hydraulic pump 21 is driven by the electric motor 22, an oil is sucked from the reservoir 25 and is output from the hydraulic pump 21. The pressurized oil is then supplied to the accumulator 24 and the supply passage 26. The pressurized oil supplied to the accumulator 24 is accumulated in the accumulator 24, while the pressurized oil supplied to the supply passage 26 is delivered to the directional control valve 11 and the differential pressure detector 18.

In case where the steering wheel 12 is not steered so that the vehicle continues to travel straight, no relative rotation is effected between the input and output shafts 111 and 112. Since the directional control valve 11 of the normally center-closed type is not operated in such state, the supply port 138 is shut off by the first land portion 136 and communicates with neither of the cylinder ports 133 and 134. The cylinder ports 133 and 134 are in communication with the drain port 135, so that the pressures in the left and right cylinder chambers 15a and 15b of the power cylinder 15 are equal to the pressure in the reservoir 25, namely to the atmospheric pressure. Therefore, the ball 171 of the shuttle valve 17 is maintained at its original position, and the atmospheric pressure is transmitted to the differential pressure detector 18 through the output port 17a. The differential pressure detector 18 outputs the pressure difference ΔP between the pressure at the supply passage 26 and the atmospheric pressure. The electric motor 22 is stopped when the differential pressure ΔP reaches a predetermined value, referred to later in detail. With this operation, a predetermined volume of the pressurized oil is accumulated in the accumulator 24. However, the differential pressure ΔP becomes small thereafter due to an oil leak from between the supply port 138 and the first land portion 136 even when the steering wheel 12 is maintained at the neutral position.

FIG. 4 is a flowchart illustrating processings executed by the CPU 311 for carrying out the present invention. The processings are performed when the drive control program stored in the ROM 312 is executed by the CPU 311. Firstly, at step S1, the pressure difference ΔP output from the differential pressure detector 18 is read into the RAM 313. At step S2, a change amount of the pressure difference ΔP is calculated based upon the pressure difference ΔP read at step S1. To be concrete, the average of a plurality of the pressure differences ΔP read within a predetermined time period is compared with the average of the pressure differences ΔP read within the latest predetermined time period. At next step S3, it is Judged whether the change amount of the pressure difference ΔP is equal to or smaller than zero. If the judgement is "YES", the processings proceeds to step S5, at which the drive voltage Vm corresponding to the mean pressure difference ΔP is obtained based upon a ΔP-Vm map shown in FIG. 5(b). If the judgement is "NO", the processing proceeds to step S4, at which the drive voltage Vm corresponding to the mean pressure difference ΔP is obtained based upon another ΔP-Vm map shown in FIG. 5(a). Then, at step S6, the drive voltage Vm obtained at step S4 or step S5 is output to the motor drive circuit 32.

Figure 5A:
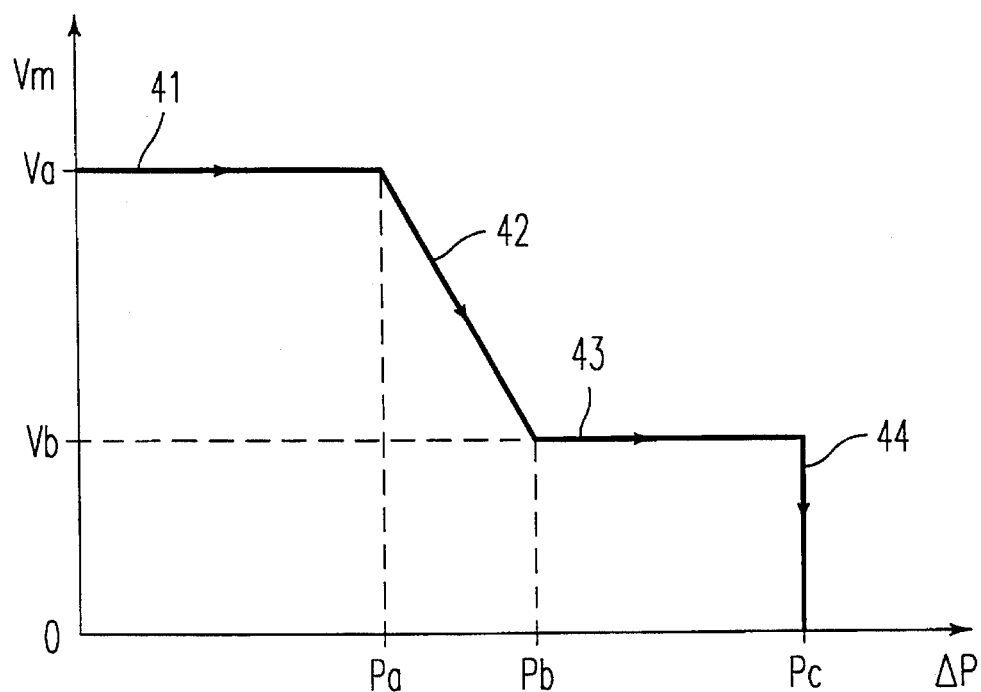
FIG. 5(a) is a graph showing the relationships between the drive voltage for controlling the electric motor and the pressure difference when a change amount of the pressure difference is larger than zero.
Figure 5B:
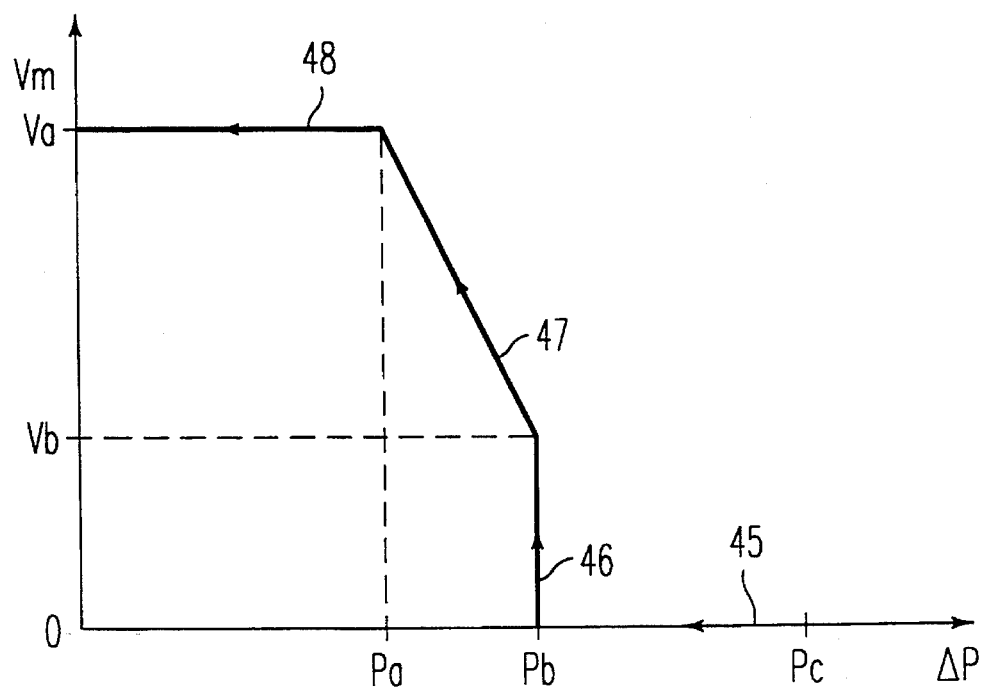
FIG. 5(b) is a graph showing the relationships between the drive voltage for controlling the electric motor and the pressure difference when a change amount of the pressure difference is equal to or smaller than zero.

The ΔP-Vm maps represented as graphs in FIGS. 5(a) and (b) define the drive voltages Vm which are selectively output to the electric motor 22 in dependence upon the pressure difference ΔP between the pressure at the supply passage 26 and a higher one of the pressures in the left and right cylinder chambers 15a and 15b. The map of FIG. 5(a) is selected when the change amount of the pressure difference ΔP is larger than zero, while the map of FIG. 5(b) is selected when the change amount of the pressure difference ΔP is equal to or smaller than zero. The maps are stored in the ROM 312.

The change amount of the pressure difference ΔP will be concretely described hereinafter. When the steering wheel 12 is steered, for example, in the clockwise direction, the relative rotation is produced between the input and output shafts 111 and 112. Upon the relative rotation, the directional control valve 11 is operated, so that the supply port 138 is brought into communication with the cylinder port 133 while the cylinder port 134 is kept in communication with the drain port 135. In this state, the pressurized oil accumulated in the accumulator 24 is supplied to the left cylinder chamber 15a of the power cylinder 15, whereby the piston 16 is moved rightward to steer the road wheels of the vehicle. During this operation, the oil in the right cylinder chamber 15b is drained to the reservoir 25 through the drain port 135 and the drain passage 25a. The pressure at the supply passage 26 thus decreases and the pressure in the left cylinder chamber 15a increases, whereby the pressure difference ΔP decreases. Namely, the change amount of the pressure difference ΔP becomes equal to or smaller than zero, so that the map of FIG. 5(b) is selected.

When the steering wheel 12 is being returned forward its neutral position, the relative rotation between the input and output shafts 111 and 112 gradually decreases. The volume of the pressurized oil supplied to the left cylinder chamber 15a also decreases. Therefore, the pressure at the supply passage 26 increases and the pressure in the left cylinder chamber 15a decreases, whereby the pressure difference ΔP increases. Namely, the change of the pressure difference ΔP becomes larger than zero, so that the map of FIG. 5(a) is selected.

Referring to FIG. 5(a), while the pressure difference ΔP is smaller than a reference value Pa, a maximum drive voltage Va is applied to the electric motor 22 to drive the hydraulic pump 21 at its maximum capacity. In a range between the reference value Pa and a second predetermined value Pb, the drive voltage Vm to the electric motor 22 is decreased in proportion to the increases in the pressure difference ΔP. In another range between the second predetermined value Pb and a first predetermined value Pc, a constant low drive voltage Vb is applied to drive the electric motor 22 at a constant low speed. When the pressure difference ΔP reaches the second predetermined value Pc, the drive voltage Vm is lowered to zero to stop the electric motor 22.

The second predetermined value Pb represents a minimum pressure difference required for power assist operation. The drive voltage Vb is set to a limit value for driving the electric motor 22 without lowering the efficiency of the electric motor 22 so much. Since the drive voltage Vb is applied to the electric motor 22 in the range between the second predetermined value Pb and the first predetermined value Pc, an amount of pressurized oil more than the volume of the oil leak is discharged from the hydraulic pump 21. Because the electric motor 22 is not driven continuously by a smaller drive voltage than the drive voltage Vb, it can be avoided that the efficiency of the electric motor 22 notably deteriorates.

Referring to FIG. 5(b), when the pressure difference ΔP is between the first predetermined value Pc and the second predetermined value Pb, the drive voltage Vm is set to zero to stop the electric motor 22. As soon as the pressure difference ΔP reaches the second predetermined value Pb, the drive voltage Vm is immediately increased to the voltage Vb and thereafter, is gradually increased between Vb and Va in proportion to the decreases of the pressure difference ΔP. Then, after the pressure difference ΔP decreases to the reference value Pa, the drive voltage Va is applied to the electric motor 22.

As described above, upon starting of returning the steering wheel 12 toward the neutral position, the pressure difference ΔP increases. In such state, the processings are executed in order of steps S1, S2, S3, S4 and S6 of FIG. 4, during which time the drive voltage Vm obtained at step S4 in dependence upon the detected mean pressure difference ΔP calculated at step S4 is output to the electric motor 22. The drive voltage Vm is therefore changed in the order indicated by the arrows 41, 42, 43 and 44 in FIG. 5(a). When the pressure difference ΔP reaches the first predetermined value Pc, the electric motor 22 is stopped. To the contrary, as the steering wheel 12 is steered from the neutral position in either direction, the pressure difference ΔP decreases. In such state, the processings are executed in the order of steps S1, S2, S3, S5 and S6 of FIG. 4, during which time the drive voltage Vm obtained at step S5 in dependence upon the detected mean pressure difference ΔP is output to the electric motor 22. The drive voltage Vm is therefore changed in the order indicated by the arrows 45, 46, 47 and 48 in FIG. 5(b).

When the steering wheel 12 is maintained at the neutral position, the pressure difference ΔP slowly decreases due to the oil leak. This situation is represented by the arrow 45 in FIG. 5(b). When the pressure difference ΔP decreases to the second predetermined value Pb, the drive voltage Vb is output to drive the electric motor 22 at the constant low speed. This situation is represented by the arrow 46 in FIG. 5(b) and the arrow 43 in FIG. 5(a). Then, when the pressure difference ΔP again increases to the first predetermined value Pc, the drive voltage Vm is lowered to zero to stop the electric motor 22. This situation is represented by the arrow 44 in FIG. 5(a).

Therefore, while the steering wheel 12 is maintained at the neutral position, a series of processings of steps S1, S2, S3, S4 and S6 and another series of processings of steps S1, S2, S3, S5 and S6 of FIG. 4 are alternately executed. Namely, when the electric motor 22 is driven to make the pressure difference ΔP become larger than the second predetermined value Pb, the series of the processings of steps S1, S2, S3, S4 and S6 are selected and repeatedly executed until the pressure difference ΔP reaches the first predetermined value Pc. The electric motor 22 is stopped at the first predetermined value Pc of the pressure difference ΔP. Subsequently, the series of the processings of steps S1, S2, S3, S5 and S6 are selected and repeatedly executed until the pressure difference ΔP decreases to the second predetermined value Pb. Such control is repeated to drive the electric motor 22 intermittently.

FIG. 6 is a graph showing time-dependent changes of the drive voltage and the pressure difference while the steering wheel 12 is maintained at its neutral position. In the graph, the drive voltage Vm and the pressure difference ΔP are taken in the ordinate, and the time t is taken in the abscissa.

Between time t11 and time t12, steps S1–S4 and S6 are executed, and the drive voltage to the motor 22 is kept to be the value Vb, as indicated by the curve fd, whereby the pressure difference ΔP increases from the second predetermined value Pb to the first predetermined value Pc, as indicated by the curve fc. Between time t12 and time t21, steps S1–S3 and S5–S6 are executed, and the drive voltage Vm to the motor 22 is kept zero, whereby the pressure difference ΔP gradually decreases and finally reaches the second predetermined value Pb. The increase and decrease of the pressure difference ΔP between time t11 and t21 is repeated thereafter, that is between time t21 and time t31, and after time t31.

Consequently, the pressure difference ΔP (second predetermined value Pb in this embodiment) which is required for avoiding the assist delay can always be maintained at the very beginning of steering operation. Further, since the electric motor 22 is intermittently driven at a low speed (drive voltage Vb in this embodiment) within a range that the efficiency of the electric motor 22 does not deteriorate so much, the consumption of electric power can be minimized.

Obviously, numerous modifications and variations of the present invention are possible in light of the above teachings. It is therefore to be understood that within the scope of the appended claims, the present invention may be practiced otherwise than as specifically described herein.

What is claimed is:

1. A power steering apparatus comprising:

a hydraulic actuator having a pair of cylinder chambers and operable to generate assisting power;

a hydraulic pump for supplying pressurized fluid;

an electric motor for operating said hydraulic pump;

a directional control valve mechanism of center-closed type operable by a steering wheel for delivering the pressurized fluid supplied by said hydraulic pump selectively to said pair of cylinder chambers of said hydraulic actuator through a supply passage;

detection means for detecting differential pressure between a pressure at said supply passage and a higher one of pressures in said pair of cylinder chambers; and motor control means for controlling said electric motor to drive said electric motor intermittently while the steering wheel is at its neutral position at such a speed as to return the differential pressure to a predetermined first value, comprising, a drive voltage control circuit for outputting a drive voltage depending on the detected differential pressure to said electric motor, wherein while the steering wheel is at the neutral position, said drive voltage control circuit outputs no drive voltage to stop said electric motor until the differential pressure decreases from said first predetermined value to a second predetermined value, but thereafter outputs a drive voltage to drive said electric motor at said speed so as to return the differential pressure to said first predetermined value.

2. A power steering apparatus according to claim 1, wherein said second predetermined value represents a minimum differential pressure required for power assist operation.

3. A power steering apparatus according to claim 1, wherein while the steering wheel is at the neutral position, a constant drive voltage is output to said electric motor until the differential pressure reaches said first predetermined value after the differential pressure decreases from said first predetermined value to said second predetermined value.

4. A power steering apparatus according to claim 1, wherein the drive voltage output to said electric motor is changed in proportion to the change in the differential pressure while the differential pressure is between said second predetermined value and a third predetermined value smaller than said second predetermined value, while a maximum drive voltage is output to said electric motor while the differential pressure is smaller than said third predetermined value.

5. A power steering apparatus according to claim 1, further comprising:

an accumulator connected to said supply passage for accumulating therein the pressurized fluid supplied from said hydraulic pump.

6. A power steering apparatus according to claim 5, further comprising:

valve means interposed between said hydraulic pump and said accumulator for enabling said accumulator to accumulate the pressurized fluid.

7. A power steering apparatus according to claim 1, wherein said drive voltage control circuit includes:

memory means for storing first and second maps each defining the relationships between the differential pressure and the drive voltage, said first map being used primarily when the steering wheel is returned to the neutral position and said second map being used primarily when said steering wheel is turned from the neutral position in either direction.

8. A power steering apparatus according to claim 1, wherein said directional control valve mechanism comprises:

input and output members relatively rotatable and respectively connected with the steering wheel and at least one road wheel of a vehicle, said input and output members being for operating said directional control valve mechanism upon relative rotation therebetween.

* * * * *